United States Patent [19]

Gill

[11] 4,153,167
[45] May 8, 1979

[54] CROSS TUBE CONSTRUCTION
[75] Inventor: Stephen H. Gill, Mentor, Ohio
[73] Assignee: Caterpillar Tractor Co., Peoria, Ill.
[21] Appl. No.: 813,729
[22] Filed: Jul. 7, 1977
[51] Int. Cl.² ............................................. E02F 3/38
[52] U.S. Cl. ................................. 214/138 R; 52/115;
52/721; 212/144; 403/263; 414/727
[58] Field of Search ................... 214/138 R, 140, 135,
214/145 R, 769, 770, 773, 776, 777; 212/144;
52/115, 119, 721, 731; 403/244, 263; 182/2,
217, 228

[56] References Cited
U.S. PATENT DOCUMENTS

| 3,104,771 | 9/1963 | Stilley | 214/770 |
|---|---|---|---|
| 3,254,780 | 6/1966 | Midtbo | 212/144 X |
| 3,327,385 | 6/1967 | Shaver | 182/228 X |
| 3,784,162 | 1/1974 | Channell et al. | 298/22 J X |
| 3,877,544 | 4/1975 | McCollum | 182/2 X |

FOREIGN PATENT DOCUMENTS 123374  2/1919  United Kingdom ...................... 52/721

Primary Examiner—L. J. Paperner
Attorney, Agent, or Firm—Phillips, Moore, Weissenberger, Lempio & Majestic

[57] ABSTRACT

A shovel linkage for a hydraulic excavator includes a cross tube having pivot joints, and actuating cylinders for the linkage connected to said pivot joints thereon whereby forces imparted to the linkage by the actuating cylinders will be directly through the center of the cross tube, avoiding bending moments in the linkage.

The cross tube has an internal diametrical member in line with the pivot joints and the actuating cylinders to withstand and transmit the forces imparted by the actuating cylinders.

6 Claims, 6 Drawing Figures

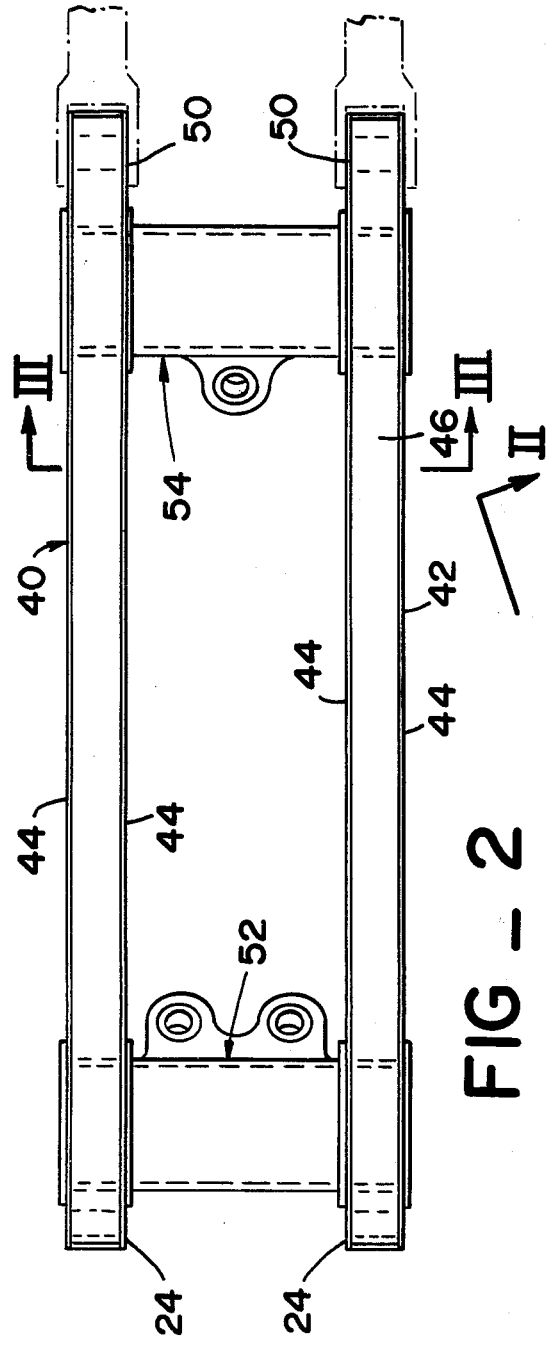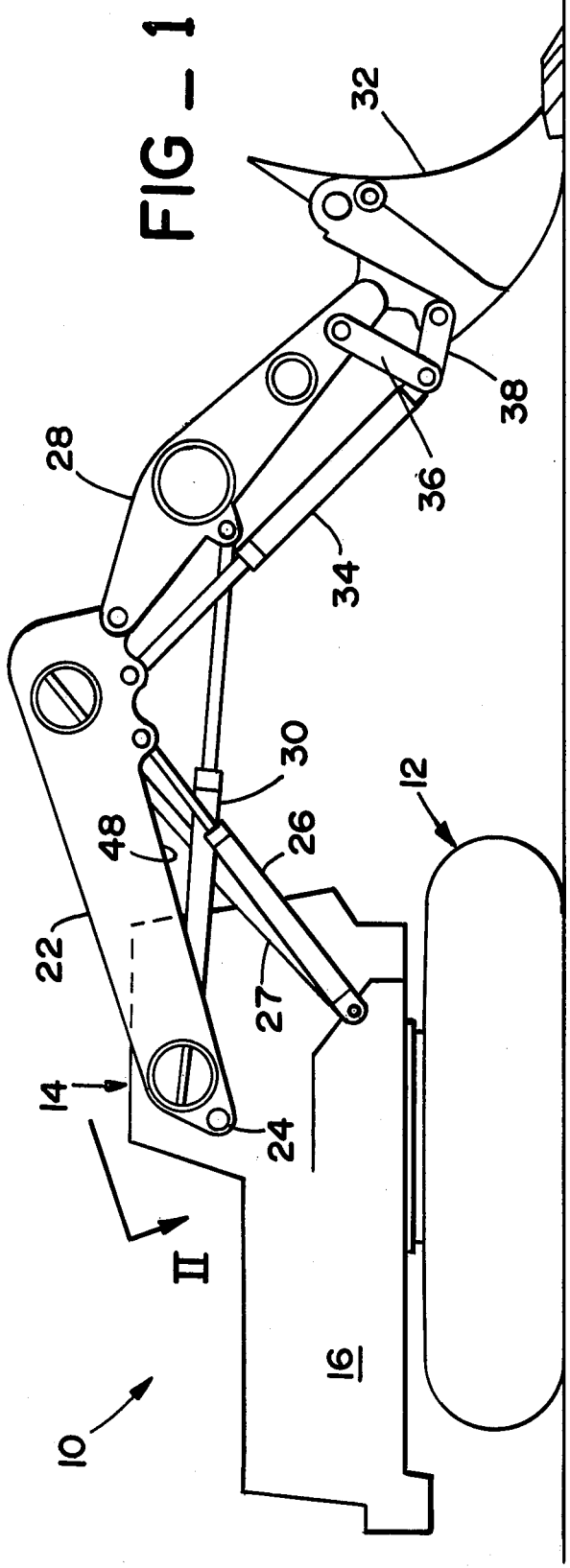

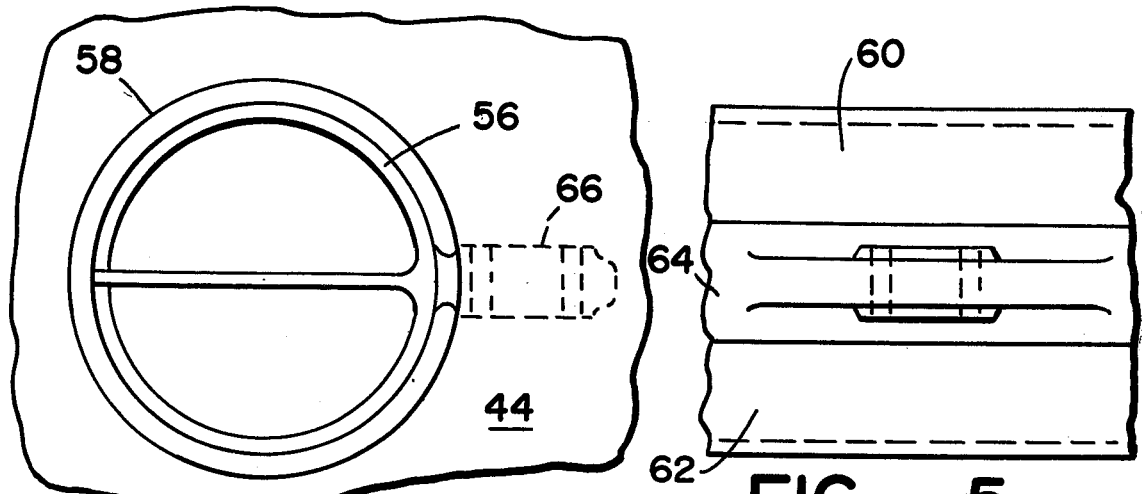
FIG_4
FIG_5
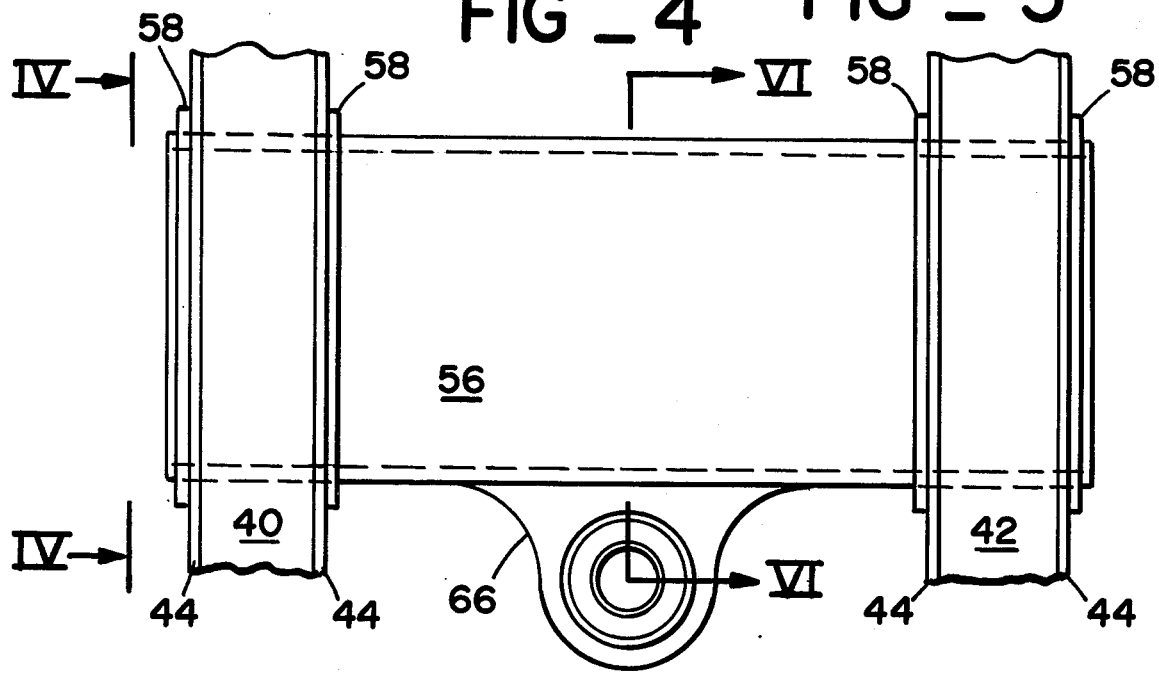
FIG_3
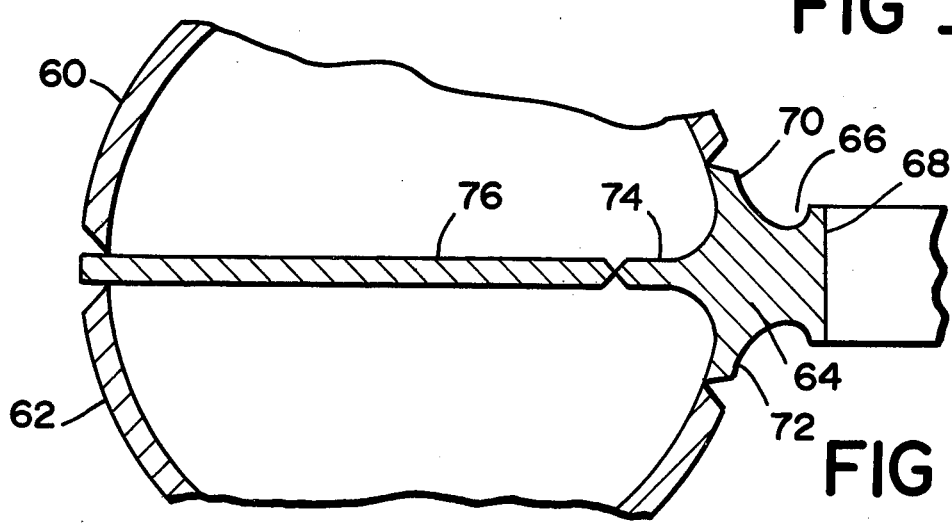
FIG_6

CROSS TUBE CONSTRUCTION

BACKGROUND OF THE INVENTION

This invention relates to the field of shovel linkages for hydraulic excavators and the like. Typically such linkages comprise a link, generally known as a boom, pivotally mounted on the frame of the excavator, and a second link, known as a stick, pivotally mounted on the distal end of the boom, and having a implement, such as a bucket, pivotally mounted on the distal end thereof. The bucket is manipulated both vertically and horizontally in the plane defined by the boom and stick by pivotal movement of the boom with respect to the frame, the stick with respect to the boom, and the bucket with respect to the stick. Such actuation is effected and controlled by means of hydraulic actuating cylinders pivotally interconnecting the bucket and the stick, the stick and the boom, and the boom and the frame of the excavator. Such cylinders are typically connected to suitable brackets affixed to and projecting from these members. During the work cycle of a large shovel, it is necessary for the hydraulic actuating cylinders to apply large loads to the linkage members thru the brackets or other attachment means by which they are connected to such members. Due to the manner in which the cylinders are secured to the shovel linkage members in prior art designs, moment arms exist which cause the cylinders to induce large torsional loads in the linkage members, which may lead to early fatigue of portions thereof.

SUMMARY OF THE PRESENT INVENTION

Accordingly it is an object of the present invention to provide a shovel linkage for a hydraulic excavator whereby the actuating cylinders thereof will impart direct loads to the members of the linkage so that torsional loads are not generated in the members.

A further object of the present invention is to provide a shovel linkage that is exceptionally strong and able to withstand and transmit high loads imparted thereto by the actuating cylinders thereof.

These and other objects and advantages are achieved by the present invention which comprises a shovel linkage having a boom and stick both comprising parallel rails joined by cross tubes having pivot joints provided thereon for pivotal connection of hydraulic jacks thereto, for operation of the associated links. The cross tubes and brackets, and the related actuating cylinders are so arranged that the forces imparted to the cross tubes by the cylinders upon actuation thereof are directed along a diameter of the cross tubes. A support member is provided internally of the cross tube along the same diameter for additional strength.

DESCRIPTION OF THE DRAWINGS

In the drawings:

FIG. 1 is a elevational view of a hydraulic excavator equipped with a shovel linkage embodying the present invention, FIG. 2 is a plan view of the boom link of FIG. 1 taken along the line and in the direction indicated by the arrows II—II, FIG. 3 is a view of the cross tube shown in FIG. 2 taken along the line and in the direction indicated by the arrows III—III, FIG. 4 is an end view of the cross tube and rail shown in FIG. 3 taken along the line and in the direction indicated by the arrows IV—IV, FIG. 5 is an end view of a portion of the cross tube shown in FIG. 4 as seen from the right, and FIG. 6 is a sectional view of the cross tube shown in FIG. 3 taken along the line and in the direction indicated by the arrows VI—VI.

DESCRIPTION OF THE PREFERRED EMBODIMENT

Referring to FIG. 1, a hydraulic excavator is shown generally at 10 as comprising an undercarriage 12, and a frame 14 pivotally mounted thereon, which includes an engine compartment 16 and an operator's cab 18. Mounted on frame 14 and extending forwardly thereof is a shovel linkage indicated generally by the reference numeral 20. The shovel linkage includes a boom 22 pivotally mounted on frame 14 by means of pivots 24 and actuable with respect to the frame by means of a pair of hydraulic cylinders 26 pivotally mounted to the excavator frame 14 and to the forward end of the boom 22, and a hydraulic slave cylinder 27, as described in application Ser. No. 522,204, abandoned, pivotally connected to the frame and to the boom as will be described hereinafter.

Pivotally mounted to the forward end of the boom is a stick 28 which is actuable with respect to the boom by means of a pair of hydraulic cylinders 30 pivotally connected to the boom and to the stick as will be described hereinafter.

Pivotally connected to the distal end of the stick is a bucket 32 which is actuable with respect to the stick by means of hydraulic cylinders 34 which are pivotally connected to the forward end of the boom and to links 36 and 38 which are pivotally connected to the stick and bucket respectively.

It will be understood that during the working cycle of the hydraulic excavator, bucket 32 will be loaded by selected movement in the planes defined in the boom and stick assembly by means of hydraulic cylinders 26, 30 and 24, which at times must place heavy loads on the shovel linkage, such as when moving the bucket thru earth during loading. The shovel linkage of the present invention is constructed to withstand such heavy loads without imparting bending moments to the members thereof, or otherwise unduly loading the members of the linkage.

Referring to FIG. 2, boom 22 is shown as comprising spaced parallel rails 40 and 42 which are of a generally boxlike configuration and include side walls 44 joined by top and bottom walls 46 and 48. Pivots 24 are provided in one end of rails 40 and 42 for pivotal connection of the boom to the excavator frame 14 is previously described. Additional pivots 50 are provided in the other ends of the rails for pivotal connection of the stick thereto.

Rails 40 and 42 are interconnected by means of cross tubes 52 and 54.

Referring to FIG. 3, the cross tubes comprise cylindrical members 56 which extend thru appropriate openings in the side walls 44 of rails 40 and 42 and are retained therein by means of flanges 58 secured to cylindrical members immediately adjacent to the side walls of the rails.

As shown in FIG. 6, cylindrical members 56 comprise arcuate members 60 and 62 and a bracket member 64 which includes a tab portion 66 having a pivot bore 68 provided therein for a pivotal attachment of a hydraulic cylinder rod thereto. Bracket member 64 also includes arcuate portions 70 and 72 which abut members 60 and 62. Member 64 also includes a diametral portion 74 which extends inwardly of the cylindrical member and abuts a diametral backing member 76 which extends across a diameter of the cylindrical member and is abutted at the opposite side of the cylindrical member from bracket member 64 by the edges of arcuate members 60 and 62. During assembly of the cross tube, the members are welded together at the junctures shown to provide a unitary member.

It will be noted that diametral portion 74 of bracket member 64 and diametral backing member 76 define a diameter of cylindrical member 56 which extends thru the center of tab portion 66 of bracket 64 and is normal to pivot bore 68 provided therein. It will also be noted from FIG. 1 that hydraulic cylinder 30 is longitudinally aligned with the diametral backing member in cross tube 52, and cylinder 27 is aligned similarly with the diametral backing member in cross tube 54. Accordingly, forces exerted on the cross tube members by the hydraulic cylinder connected thereto at pivot bores 68 will be directed thru the centers of the cross tubes. Accordingly no unnecessary bending moments will be imparted to the cross tube or boom rails of the shovel linkage. In addition the force exerted on the cross tube by the hydraulic cylinder attached at pivot bore 68 will be directed along diametral backing member 76, resulting in greater strength in the cross tube and better distribution of the forces exerted by the hydraulic cylinder on the cross tube.

The embodiments of the invention in which an exclusive property of privilege is claimed are defined as follows:

1. A shovel linkage for a hydraulic excavator or the like comprising a boom pivotally attached to the excavator, a stick pivotally connected to said boom, said boom and said stick comprising spaced parallel rails, and cross tubes connecting said rails, wherein said cross tubes include a bracket means for connection of hydraulic cylinder means thereto, said hydraulic cylinder means and said bracket means are so arranged that the cylinder means will exert forces on the cross tubes which extend through the center thereof; and
   wherein the cross tubes include a diametral backing member disposed along a diameter of the tube coincident with forces exerted on the tube by the hydraulic cylinder means attached to the respective bracket means; and
   wherein said cross tube comprises arcuate cylindrical members and a bracket member joined circumferentially to define a cylindrical tube, and wherein said diametral backing member extends across a diameter of the tube from a juncture of the arcuate members to the bracket member, and wherein said bracket member includes an outstanding tab portion having a pivot journal provided therein.

2. The construction defined in claim 1 wherein said bracket member further comprises a inwardly projecting diametral portion disposed in the same diameter as the diametral backing member and extending inwardly of the tube to said backing member, and wherein the backing member is disposed along a diameter of the tube which extends thru the center of said bracket member and tab portion thereof and is normal to the pivot bore provided therein, whereby forces exerted on the cross tube by the hydraulic cylinder means attached to the tab portion of the bracket member will be directed thru the center of the cross tube along a diameter thereof coincident with the backing member thereof.

3. The construction defined in claim 2 wherein the arcuate members, the bracket member and the backing member are welded together to provide a unitary cross tube.

4. A linkage member operable by a hydraulic cylinder comprising, spaced parallel rails, and cross tubes connecting said rails, said cross tubes comprising tubular members which extend between and through said rails and are secured therein;
   wherein said cross tubes include a bracket means for connection of the hydraulic cylinder thereto, said hydraulic cylinder and said bracket means are so arranged that the cylinder will exert forces on the cross tubes which extend through the center thereof;
   wherein the cross tubes include a diametral backing member disposed along a diameter of the tube coincident with forces exerted on the tube by the hydraulic cylinder attached to the respective bracket means; and
   wherein said cross tube comprises arcuate cylindrical members and a bracket member joined to define a cylindrical tube, and wherein said diametral backing member extends across a diameter of the tube from a juncture of the arcuate members to the bracket member, and wherein said bracket member includes an outstanding tab portion having a pivot journal provided therein.

5. The construction defined in claim 4 wherein said bracket member further comprises an inwardly projecting diametral portion disposed in the same diameter as the diametral backing member and extending inwardly of the tube to said backing member, and wherein the backing member is disposed along a diameter of the tube which extends thru the center of said bracket member and tab portion thereof and is normal to the pivot bore provided therein, whereby forces exerted on the cross tube by the hydraulic cylinder attached to the tab portion of the bracket member will be directed thru the center of the cross tube along a diameter thereof coincident with the backing member thereof.

6. The construction defined in claim 5 wherein the arcuate members, the bracket member and the backing member are welded together to provide a unitary cross tube.

* * * * *